US010650803B2

(12) United States Patent
Fukuda et al.

(10) Patent No.: US 10,650,803 B2
(45) Date of Patent: May 12, 2020

(54) MAPPING BETWEEN SPEECH SIGNAL AND TRANSCRIPT

(71) Applicant: International Business Machines Corporation, Armonk, NY (US)

(72) Inventors: Takashi Fukuda, Yokohama (JP); Nobuyasu Itoh, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 15/728,584

(22) Filed: Oct. 10, 2017

(65) Prior Publication Data
US 2019/0108831 A1    Apr. 11, 2019

(51) Int. Cl.
*G10L 15/06*   (2013.01)
*G10L 15/26*   (2006.01)
*G10L 25/78*   (2013.01)

(52) U.S. Cl.
CPC ............ *G10L 15/063* (2013.01); *G10L 15/26* (2013.01); *G10L 15/06* (2013.01); *G10L 25/78* (2013.01)

(58) Field of Classification Search
CPC ....... G10L 15/02; G10L 15/025; G10L 15/06; G10L 15/063; G10L 15/0636
See application file for complete search history.

(56) References Cited

U.S. PATENT DOCUMENTS

| | | | |
|---|---|---|---|
| 5,649,060 A | 7/1997 | Ellozy et al. | |
| 6,243,680 B1 * | 6/2001 | Gupta | G10L 15/06 704/258 |
| 6,317,712 B1 * | 11/2001 | Kao | G10L 15/063 704/256.3 |
| 8,719,024 B1 | 5/2014 | Moreno et al. | |
| 8,831,946 B2 | 9/2014 | Mamou | |
| 8,959,019 B2 * | 2/2015 | Printz | G06Q 30/02 704/243 |

(Continued)

FOREIGN PATENT DOCUMENTS

JP    2010243914 B2    10/2010

OTHER PUBLICATIONS

Bordel et al. "Aligning Very Long Speech Signals to Bilingual Transcriptions of Parliamentary Sessions" IberSPEECH 2012. CCIS 328. pp. 69-78. Berlin Heidelberg 2012.

(Continued)

*Primary Examiner* — Michael N Opsasnick
(74) *Attorney, Agent, or Firm* — Edward P. Li

(57) ABSTRACT

A method, a computer program product, and a computer system for mapping between a speech signal and a transcript of the speech signal. The computer system segments the speech signal to obtain one or more segmented speech signals and the transcript of the speech signal to obtain one or more segmented transcripts of the speech signal. The computer system generates estimated phone sequences and reference phone sequences, calculates costs of correspondences between the estimated phone sequences and the reference phone sequences, determines a series of the estimated phone sequences with a smallest cost, selects a partial series of the estimated phone sequences from the series of the estimated phone sequences, and generates mapping data which includes the partial series of the estimated phone sequences and a corresponding series of the reference phone sequences.

18 Claims, 8 Drawing Sheets

(56) References Cited

U.S. PATENT DOCUMENTS

| | | | |
|---|---|---|---|
| 9,311,932 B2 | 4/2016 | Carter | |
| 2008/0126089 A1* | 5/2008 | Printz | G06Q 30/02 |
| | | | 704/235 |
| 2010/0318355 A1 | 12/2010 | Li et al. | |
| 2013/0262096 A1 | 10/2013 | Wilhelms-Tricarico et al. | |
| 2014/0149112 A1* | 5/2014 | Kalinli-Akbacak | G10L 25/03 |
| | | | 704/232 |
| 2014/0200890 A1* | 7/2014 | Kurniawati | G10L 15/144 |
| | | | 704/236 |
| 2015/0066506 A1 | 3/2015 | Romano et al. | |
| 2017/0229124 A1* | 8/2017 | Strohman | G10L 15/19 |
| 2018/0358019 A1* | 12/2018 | Mont-Reynaud | G10L 15/32 |
| 2019/0108831 A1* | 4/2019 | Fukuda | G10L 15/063 |

OTHER PUBLICATIONS

Bordel et al: "A simple and efficient method to align very long speech signals to acoustically imperfect transcriptions", Interspeech, 2012.

Kejia et al. "An Improved Recursive Algorithm for Automatic Alignment of Complex Long Audio" Proceedings of IC-NIDC2009. pp. 690-694.

Lamel et al. "Lightly Supervised Acoustic Model Training". ISCA ITRW ASR'2000 Paris, Lamel-Gauvain-Adda. pp. 150-154.

Moreno et al: "A recursive algorithm for the forced alignment of very long audio segments", ICSLP, 1998. Sydney Australia.

Sjolander et al. "An HMM-based system for automatic segmentation and alignment of speech". Umeå University, Department of Philosophy and Linguistics PHONUM 9 (2003), 93-96. Available online at http://www.ling.umu.se/fonetik2003.

* cited by examiner

Well, about a year I guess.
It just turned two, I believe.
Tom, how are you going. Oh, really.
That's good, yeah Well _UB about a year I guess _UB It just turned two _UB I believe _UB Tom _UB how are you going _UB Oh _UB really _UB That's good _UB yeah ... Tom _UB <Uh> how are you going _UB ... ← 22
... t o m _UB h a u a: y u: g o: i ng _UB ... ← 24

FIG. 5A

... how are you doing ... ← 331
... / h a u a: y u: d u: i ng / ... ← 341

FIG. 5B

MAPPING BETWEEN SPEECH SIGNAL AND TRANSCRIPT

BACKGROUND

The present invention relates to mapping between a speech signal and a transcript of the speech signal.

To train an acoustic model (AM) used for speech recognition, speech data aligned with a transcript of the speech data is required. The speech data may be aligned with the transcript by time indices each indicating which time range of the speech data corresponds to which phone of the transcript. An accuracy of the alignment has a big impact on a quality of the acoustic model. This alignment is difficult when the speech data relates to a long speech, and it is desirable that the speech data relates to a speech of several tens of seconds (e.g., 30 seconds) at most for the alignment. Thus, the speech data is usually segmented into utterances by referring to pauses, and then the utterances are transcribed.

Some web sites may store many pairs of the speech data and the transcript. However, most of them are not necessarily segmented into utterances of lengths appropriate for the alignment. In addition, some portions in the transcript are sometimes modified or deleted for better readability, so straightforward aligning method cannot be applicable.

SUMMARY

In one aspect, a computer-implemented method for mapping between a speech signal and a transcript of the speech signal is provided. The computer-implemented method includes obtaining the speech signal and the transcript of the speech signal. The computer-implemented method further includes segmenting the speech signal to obtain one or more segmented speech signals. The computer-implemented method further includes segmenting the transcript of the speech signal to obtain one or more segmented transcripts of the speech signal. The computer-implemented method further includes performing automatic speech recognition of the one or more segmented speech signals to obtain recognized texts. The computer-implemented method further includes converting the recognized texts into estimated phone sequences. The computer-implemented method further includes converting the one or more segmented transcripts of the speech signal into reference phone sequences. The computer-implemented method further includes calculating costs of correspondences between the estimated phone sequences and the reference phone sequences. The computer-implemented method further includes determining a series of the estimated phone sequences, the series of the estimated phone sequences being with a smallest cost. The computer-implemented method further includes selecting a partial series of the estimated phone sequences, from the series of the estimated phone sequences. The computer-implemented method further includes generating mapping data which includes the partial series of the estimated phone sequences and a corresponding series of the reference phone sequences, wherein the corresponding series corresponds to the partial series of the estimated phone sequences.

In another aspect, a computer program product for mapping between a speech signal and a transcript of the speech signal is provided. The computer program product comprises a computer readable storage medium having program code embodied therewith. The program code is executable to obtain the speech signal and the transcript of the speech signal. The program code is further executable to segment the speech signal to obtain one or more segmented speech signals. The program code is further executable to segment the transcript of the speech signal to obtain one or more segmented transcripts of the speech signal. The program code is further executable to perform automatic speech recognition of the one or more segmented speech signals to obtain recognized texts. The program code is further executable to convert the recognized texts into estimated phone sequences. The program code is further executable to convert the one or more segmented transcripts of the speech signal into reference phone sequences. The program code is further executable to calculate costs of correspondences between the estimated phone sequences and the reference phone sequences. The program code is further executable to determine a series of the estimated phone sequences, the series of the estimated phone sequences being with a smallest cost. The program code is further executable to select a partial series of the estimated phone sequences, from the series of the estimated phone sequences. The program code is further executable to generate mapping data which includes the partial series of the estimated phone sequences and a corresponding series of the reference phone sequences, wherein the corresponding series corresponds to the partial series of the estimated phone sequences.

In yet another aspect, a computer system for mapping between a speech signal and a transcript of the speech signal is provided. The computer system comprises one or more processors, one or more computer readable tangible storage devices, and program instructions stored on at least one of the one or more computer readable tangible storage devices for execution by at least one of the one or more processors. The program instructions are executable to: obtain the speech signal and the transcript of the speech signal; segment the speech signal to obtain one or more segmented speech signals; segment the transcript of the speech signal to obtain one or more segmented transcripts of the speech signal; perform automatic speech recognition of the one or more segmented speech signals to obtain recognized texts; convert the recognized texts into estimated phone sequences; convert the one or more segmented transcripts of the speech signal into reference phone sequences; calculate costs of correspondences between the estimated phone sequences and the reference phone sequences; determine a series of the estimated phone sequences, the series of the estimated phone sequences being with a smallest cost; select a partial series of the estimated phone sequences, from the series of the estimated phone sequences; and generate mapping data which includes the partial series of the estimated phone sequences and a corresponding series of the reference phone sequences, wherein the corresponding series corresponds to the partial series of the estimated phone sequences.

BRIEF DESCRIPTION OF THE SEVERAL VIEWS OF THE DRAWINGS

FIG. 5A and FIG. 5B depict an example of generation of phone sequences, in accordance with one embodiment of the present invention.

DETAILED DESCRIPTION

It is to be noted that the present invention is not limited to embodiments to be given below and may be implemented with various modifications within the scope of the present invention. In addition, the drawings used herein are for purposes of illustration, and may not show actual dimensions.

Embodiments of the present invention improve the accuracy of the alignment between speech data and a transcript of the speech data. Thus, embodiments of the present invention improve the quality of the acoustic model by segmenting the speech data and the transcript into utterances and utterance-like units, respectively; therefore, the utterances are consistent with the utterance-like units.

Figure 1:
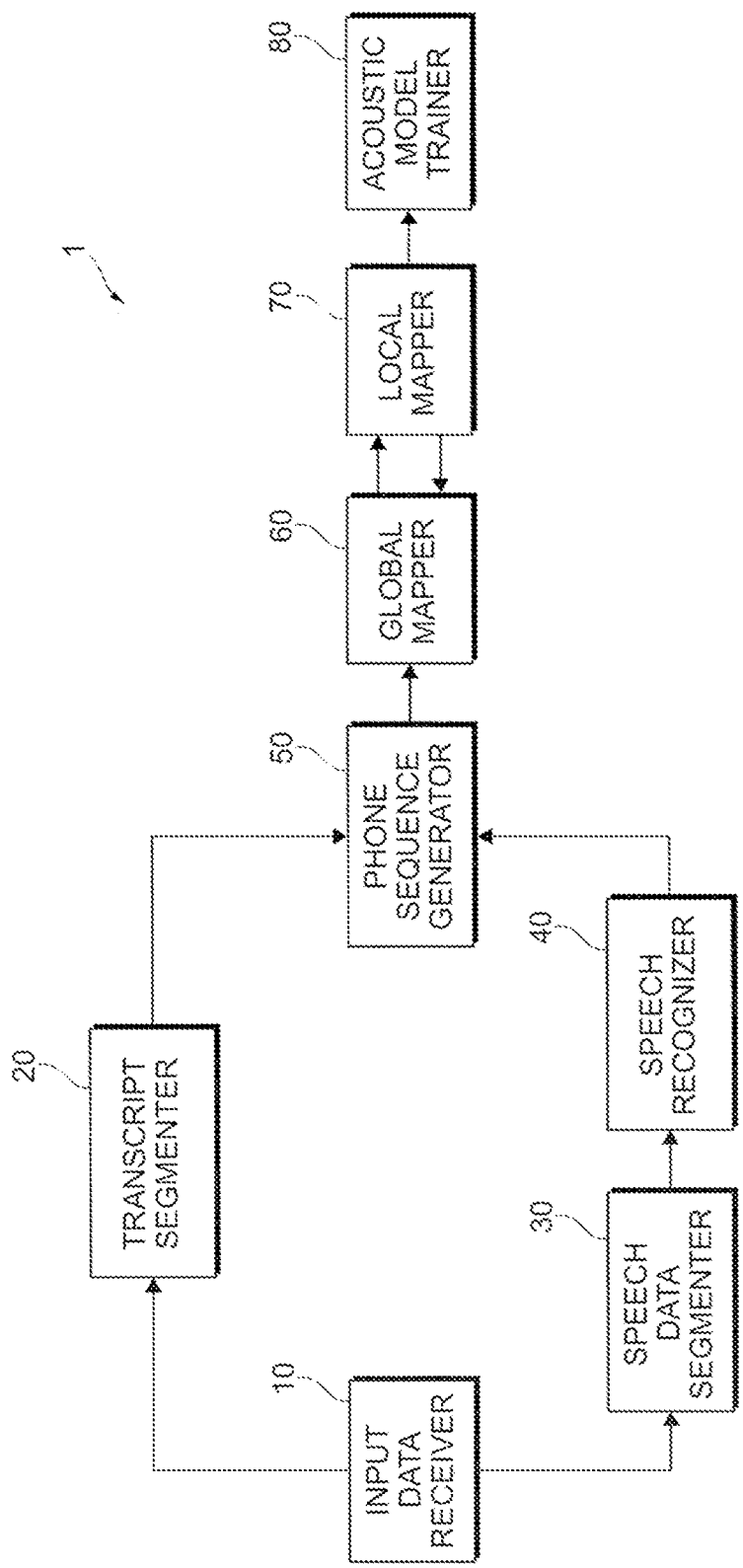
FIG. 1 depicts a block diagram of an acoustic model training system, in accordance with one embodiment of the present invention.

FIG. 1 depicts a block diagram of an acoustic model training system 1, in accordance with one embodiment of the present invention. As shown in FIG. 1, the acoustic model training system 1 includes an input data receiver 10, a transcript segmenter 20, a speech data segmenter 30, a speech recognizer 40, a phone sequence generator 50, a global mapper 60, a local mapper 70, and an acoustic model trainer 80.

The input data receiver 10 receives input data, for example, from a web site. The input data includes speech data (speech signal) and a transcript of the speech data.

The transcript segmenter 20 segments the transcript into utterance-like units by referring to markers in the transcript. The utterance-like units may be defined as texts each grasped intuitively as an utterance. The markers may be punctuations. Alternatively, the markers may be frequent word n-grams at heads or tails of utterances. By segmenting the transcript in this manner, the transcript segmenter 20 obtains one set of the utterance-like units. Note that a set of the utterance-like units serves as one example of the claimed segmented transcript, and the utterance-like unit serves as one example of the claimed transcript segment.

Figure 2A:
FIG. 2A and FIG. 2B depict an example of segmentation of a transcript, in accordance with one embodiment of the present invention.
Figure 2B:

FIG. 2A and FIG. 2B depict an example of segmentation of a transcript, in accordance with one embodiment of the present invention. FIG. 2A shows an unsegmented transcript 21, while FIG. 2B shows a segmented transcript 22. In these figures, the unsegmented transcript 21 is assumed to be converted into the segmented transcript 22 by replacement of periods and commas with utterance boundaries each expressed by a sign "_UB". Hereinafter, the k-th utterance-like unit of the segmented transcript 22 is denoted as an utterance-like unit (k) (k is a natural number).

The speech data segmenter 30 shown in FIG. 1 segments the speech data into utterance candidates using voice activity detection (VAD). By segmenting the speech data using VAD with different parameter values, the speech data segmenter 30 obtains plural sets of the utterance candidates. The different parameter values may designate; for example, plural lengths as a maximum length of pauses between the utterance candidates. Note that a set of the utterance candidates serves as one example of the claimed segmented speech signal, and the utterance candidate serves as one example of the claimed speech signal segment.

Figure 3:
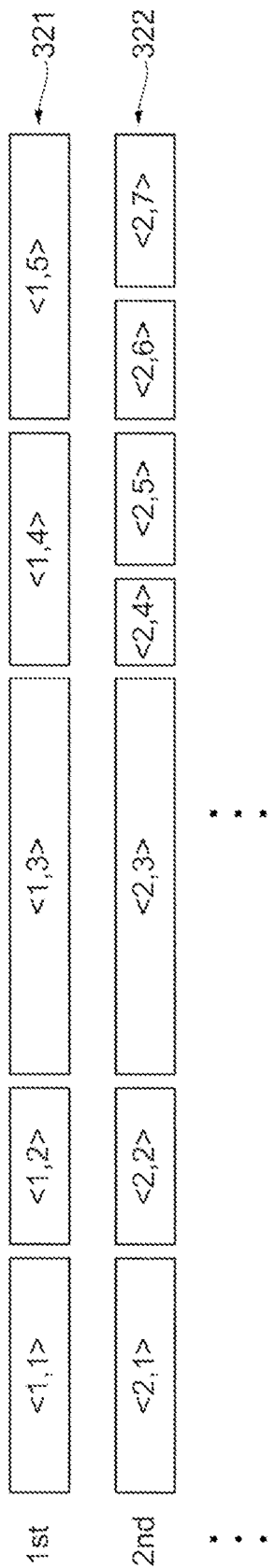
FIG. 3 depicts an example of segmentation of speech data, in accordance with one embodiment of the present invention.

FIG. 3 depicts an example of segmentation of speech data segmented by the speech data segmenter 30, in accordance with one embodiment of the present invention. FIG. 3 shows utterance candidate sets 321 and 322. The utterance candidate set 321 represents a first set of the utterance candidates obtained using VAD with a first parameter value. The utterance candidate set 322 represents a second set of the utterance candidates obtained using VAD with a second parameter value. Hereinafter, the j-th utterance candidate in the i-th utterance candidate set is denoted as an utterance candidate <i, j> (i and j are natural numbers). In FIG. 3, the utterance candidate set 321 is assumed to be a set of utterance candidates <1, 1>, <1, 2>, ..., and <1, 5>, and the utterance candidate set 322 is assumed to be a set of utterance candidates <2, 1>, <2, 2>, ..., and <2, 7>. That is, the utterance candidate <1, 4> in the utterance candidate set 321 is assumed to be further segmented into utterance candidates <2, 4> and <2, 5> in the utterance candidate set 322, and the utterance <1, 5> in the utterance candidate set 321 is assumed to be further segmented into utterance candidates <2, 6> and <2, 7> in the utterance candidate set 322.

The speech recognizer 40 shown in FIG. 1 performs automatic speech recognition (ASR) of each utterance candidate using a baseline acoustic model and a language model. By the automatic speech recognition of the utterance candidates, the speech recognizer 40 obtains recognized texts.

Figure 4:
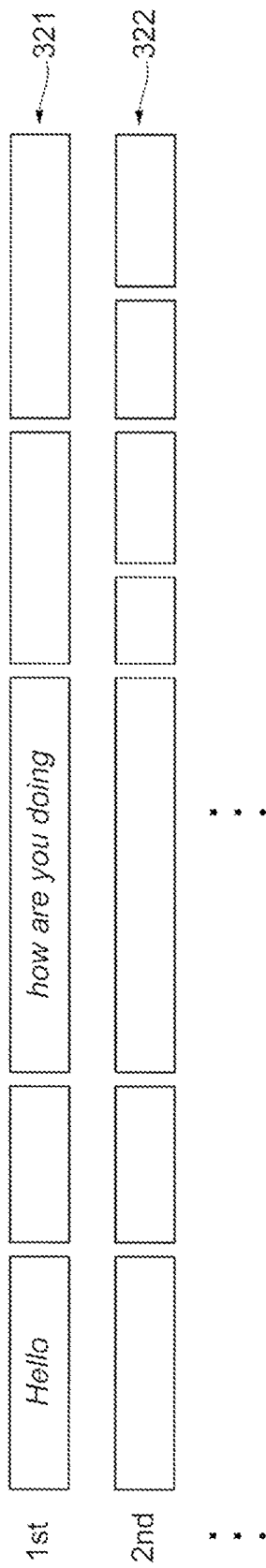
FIG. 4 depicts an example of a partial result of automatic speech recognition of utterance candidates, in accordance with one embodiment of the present invention.

FIG. 4 depicts an example of a partial result of automatic speech recognition of utterance candidates, in accordance with one embodiment of the present invention. In FIG. 4, recognized texts "Hello" and "How are you doing" are assumed to be obtained by the automatic speech recognition of the utterance candidates <1, 1> and <1, 3> in the utterance candidate set 321, respectively.

The phone sequence generator 50 shown in FIG. 1 generates two types of phone sequences. In detail, the phone sequence generator 50 generates a first type of phone sequences from the utterance-like units obtained by the transcript segmenter 20. The first type of phone sequences is referred to as "reference phone sequences". Further, the phone sequence generator 50 generates a second type of phone sequences from the recognized texts obtained by the speech recognizer 40. The second type of phone sequences is referred to as "estimated phone sequences".

FIG. 5A and FIG. 5B depict an example of generation of phone sequences by the phone sequence generator 50, in accordance with one embodiment of the present invention. FIG. 5A shows conversion from a part of the segmented transcript 22 into a part of a reference phone sequence 24. In FIG. 5A, the utterance-like units "Tom" and "How are you going" are assumed to be converted into the reference phone sequences "t o m" and "h a u a: y u: g o: i ng", respectively. FIG. 5B shows conversion from a part of the recognized texts 331 into a part of estimated phone sequences 341. In FIG. 5B, the utterance candidate "How are you doing" is assumed to be converted into the estimated phone sequence "I h a u a: y u: d u: i ng I". Hereinafter, the reference phone sequence generated from the utterance-like unit (k) is denoted as a reference phone sequence (k), and the estimated phone sequence generated from the utterance candidate <i, j> is denoted as an estimated phone sequence <i, j>.

The global mapper 60 shown in FIG. 1 performs global mapping. The global mapping may be processing of calculating a metric Corre$\overline{spon}$dence using the following formula.

$$\text{Corre}\overline{spon}\text{dence} = \arg\min_{k \to <i,j>} \Sigma_{k \to <i,j>} \text{Cost}(k \to <i,j>)$$

In this formula, the calculation of the metric Corre$\overline{spon}$dence is to find a correspondence between the reference phone sequences and a series of estimated phone sequences which minimizes cost of the correspondence. In other words, when the cost of the correspondence is minimum, the correspondence may provide the best global mapping.

The cost of the correspondence may be calculated by summing cost function values Cost($k \to <i,j>$) (i=1, 2, ..., j=1, 2, ..., k=1, 2, ...). A cost function value Cost ($k \to <i,j>$) may be calculated using the following formula.

$$\text{Cost}(k \to <i, j>) = \text{argmin}_{(l,m)} \sum_{l,m} \text{distance}(p_l, p_m)$$

The cost function value Cost($k \to <i,j>$) may be a distance between the reference phone sequence (k) and the estimated phone sequence <i, j>. The distance may be a minimum of the sum of distance function values distance($p_l, p_m$) (l=1, 2, ..., m=1, 2, ...). A distance function value distance($p_l, p_m$) may indicate a distance between a phone $p_l$ in the reference phone sequence (k) and a phone $p_m$ in the estimated phone sequence <i, j>. The global mapper 60 may obtain a result of local mapping described below from the local mapper 70 (shown in FIG. 1), and may calculate the distance between the reference phone sequence (k) and the estimated phone sequence <i, j> using the result of the local mapping.

By the global mapping, the global mapper 60 may determine a series of estimated phone sequences which causes the cost of the correspondence to be the smallest (i.e., a series of estimated phone sequences with the smallest cost).

Figure 6:
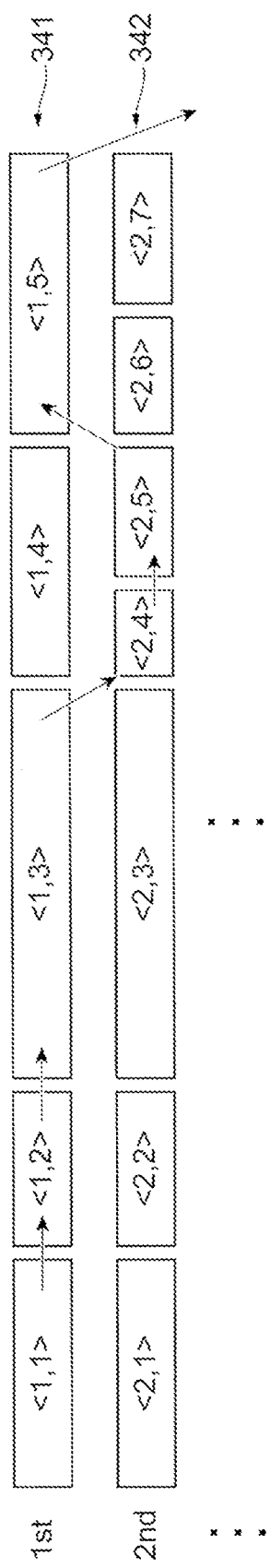
FIG. 6 depicts an example of a result of global mapping, in accordance with one embodiment of the present invention.

FIG. 6 depicts an example of a result of global mapping performed by the global mapper 60 shown in FIG. 1, in accordance with one embodiment of the present invention. FIG. 6 shows the result of the global mapping of the estimated phone sequences 341 and 342 with the reference phone sequence 24 (shown in FIG. 5A). In FIG. 6, the global mapping is assumed to be the best when a series of estimated phone sequences <1, 1>, <1, 2>, <1, 3>, <2, 4>, <2, 5>, and <1, 5> is selected. Note that this selected series of estimated phone sequences may be regarded as existing across the estimated phone sequences 341 and 342.

The local mapper 70 (shown in FIG. 1) performs the local mapping. The local mapping may be processing of mapping between phones in the reference phone sequence (k) and phones in the estimated phone sequence <i, j> (i=1, 2, ..., j=1, 2, ..., k=1, 2, ...). The local mapper 70 provides the result of the local mapping to the global mapper 60 when called from the global mapper 60.

Further, the local mapper 70 selects, from the series of estimated phone sequences determined above, a partial series of estimated phone sequences which causes the cost of the correspondence to be small enough (i.e., a partial series of estimated phone sequences with small enough cost). The term "small enough cost" indicates that although having determined a series of estimated phone sequences with the smallest cost, the local mapper 70 does not necessarily select the entire series of estimated phone sequences. For example, in FIG. 6, if the distance between the estimated phone sequence <2, 5> and the corresponding reference phone sequence is extremely large, the local mapper 70 excludes the estimated phone sequence <2, 5> from the series of estimated phone sequences. Alternatively, the local mapper 70 selects, from the reference phone sequences, a partial series of reference phone sequences which causes the cost of the correspondence to be small enough (i.e., a partial series of reference phone sequences with small enough cost). The local mapper 70 uses the result of the local mapping which has already been performed, to select the partial series of estimated phone sequences with small enough cost or the partial series of reference phone sequences with small enough cost.

By the local mapping, the local mapper 70 generates mapping data. The mapping data includes a series of estimated phone sequences with small enough cost and the corresponding reference phone sequences.

The acoustic model trainer 80 (shown in FIG. 1) generates the speech data aligned with the transcript by the time indices, using the mapping data. The acoustic model trainer 80 trains an acoustic model using the speech data aligned with the transcript.

Figure 7:
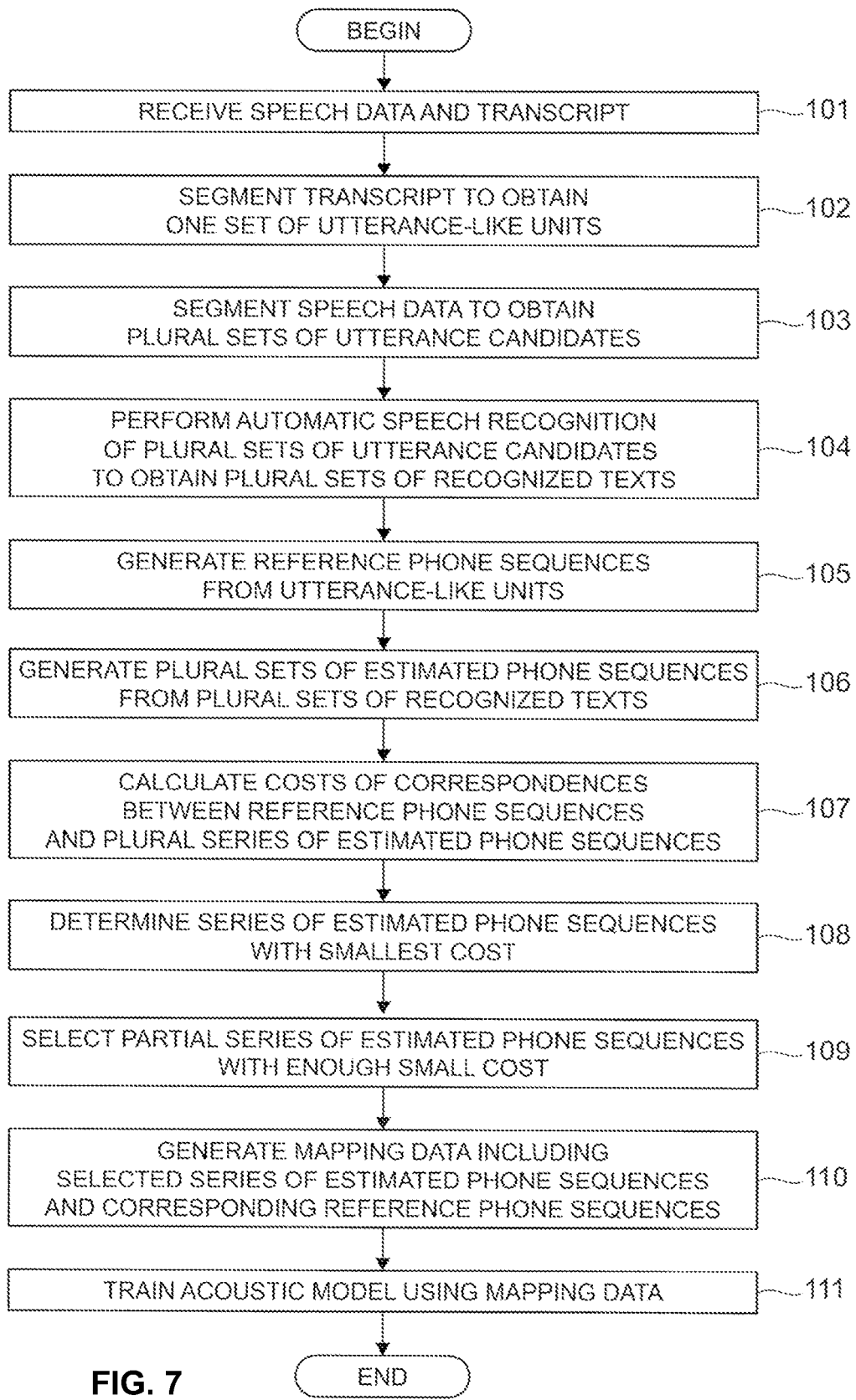
FIG. 7 depicts a flowchart representing an example of an operation of an acoustic model training system, in accordance with one embodiment of the present invention.

FIG. 7 depicts a flowchart representing an example of an operation of an acoustic model training system 1 (shown in FIG. 1), in accordance with one embodiment of the present invention. As shown in FIG. 7, at step 101, the input data receiver 10 (shown in FIG. 1) receives speech data and the transcript as input data, for example, from a web site.

At step 102, the transcript segmenter 20 (shown in FIG. 1) segments the transcript to obtain one set of utterance-like units. The transcript may be segmented by referring to markers such as punctuations, frequent word n-grams at heads or tails of utterances, and the like.

At step 103, the speech data segmenter 30 (shown in FIG. 1) segments the speech data to obtain plural sets of utterance candidates. Specifically, the speech data segmenter 30 segments the speech data using voice activity detection (VAD) with different parameter values.

At step 104, the speech recognizer 40 (shown in FIG. 1) performs automatic speech recognition of the plural sets of the utterance candidates to obtain plural sets of recognized texts.

When the utterance-like units and the plural sets of the recognized texts are obtained at steps 102 and 104, the phone sequence generator 50 (shown in FIG. 1) at step 105 generates reference phone sequences from the utterance-like units. At step 106, the phone sequence generator 50 generates plural sets of estimated phone sequences from the plural sets of the recognized texts.

At step 107, the global mapper 60 (shown in FIG. 1) calculates costs of correspondences between the reference phone sequences and plural series of the estimated phone sequences, each of which includes estimated phone sequences existing across the plural sets of estimated phone sequences. Specifically, the global mapper 60 calculates the costs by summing up local mapping costs obtained from the local mapper 70 (shown in FIG. 1).

At step 108, the global mapper 60 determines a series of estimated phone sequences with the smallest cost. Specifically, the global mapper 60 determines the series of estimated phone sequences which causes cost of a correspondence between the reference phone sequences and the series of estimated phone sequences to be the smallest.

At step 109, the local mapper 70 selects, from the series of estimated phone sequences determined above, a partial series of estimated phone sequences with small enough cost. Specifically, the local mapper 70 selects the partial series of estimated phone sequences which causes the cost of the correspondence between the reference phone sequences and the partial series of estimated phone sequences to be small enough. Then, at step 110, the local mapper 70 generates mapping data including the selected series of estimated phone sequences and the corresponding reference phone sequences.

At step 111, the acoustic model trainer 80 (shown in FIG. 1) trains an acoustic model using the mapping data. Specifically, the acoustic model trainer 80 generates the speech data aligned with the transcript by the time indices, using the mapping data. Then, the acoustic model trainer 80 trains the acoustic model using the speech data aligned with the transcript.

Next, an alternative exemplary embodiment will be described.

Although assumed to obtain one set of the utterance-like units by segmenting the transcript in the preferred exemplary embodiment, the transcript segmenter 20 is assumed to obtain plural sets of the utterance-like units by segmenting the transcript in the alternative exemplary embodiment. Specifically, the transcript segmenter 20 segments the transcript under plural conditions. The plural conditions may include, for example, a condition of using only periods, a condition of using periods and commas, and the like.

In this case, the speech data segmenter 30 obtains one set of the utterance candidates or plural sets of the utterance candidates by segmenting the speech data.

That is, in the exemplary embodiments, the transcript segmenter 20 can be regarded as segmenting the transcript to obtain one or more segmented transcripts, and the speech data segmenter 30 can be regarded as segmenting the speech signal to obtain one or more segmented speech signals (excluding a case where the transcript segmenter 20 segments the transcript to obtain one segmented transcript and the speech data segmenter 30 segments the speech signal to obtain one segmented speech signal).

Further, in the case where the transcript segmenter 20 obtains plural sets of the utterance-like units and the speech data segmenter 30 obtains one set of the utterance candidates, the global mapper 60 determines a series of reference phone sequences which causes the cost of the correspondence to be the smallest. Then, the local mapper 70 generates mapping data including the determined series of reference phone sequences and the corresponding series of estimated phone sequences.

Alternatively, in the case where the transcript segmenter 20 obtains plural sets of the utterance-like units and the speech data segmenter 30 obtains plural sets of the utterance candidates, the global mapper 60 determines a series of reference phone sequences and a series of estimated phone sequences which cause the cost of the correspondence to be the smallest. Then, the local mapper 70 may generate mapping data including the determined series of reference phone sequences and the determined series of estimated phone sequences.

That is, in the exemplary embodiments, the local mapper 70 can be regarded as generating mapping data indicating a mapping between a series of speech signal segments and a series of transcript segments on the condition that the series of speech signal segments exist across plural segmented speech signals or on the condition that the series of transcript segments exist across plural segmented transcripts.

Figure 8:
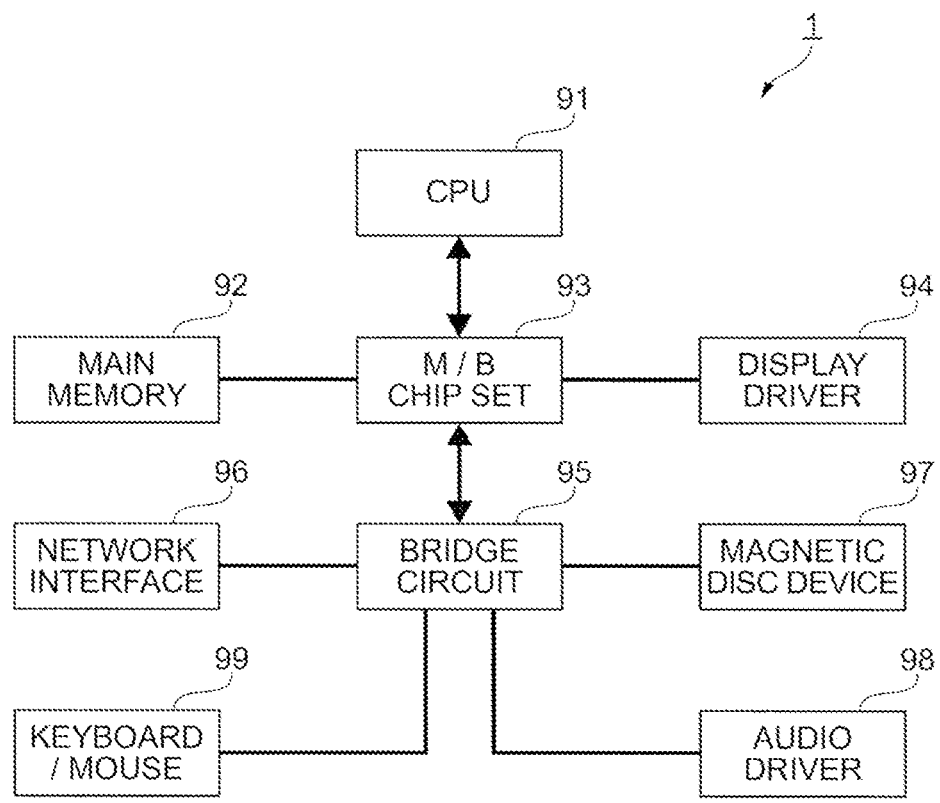
FIG. 8 depicts an example of a hardware configuration of an acoustic model training system, in accordance with one embodiment of the present invention.

FIG. 8 depicts an example of a hardware configuration of an acoustic model training system 1 shown in FIG. 1, in accordance with one embodiment of the present invention. As shown in FIG. 8, the acoustic model training system 1 includes a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, a magnetic disk device 97, an audio driver 98, and a keyboard/mouse 99 are also connected to the M/B chip set 93 via a bridge circuit 95.

Referring to FIG. 8, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for mapping between a speech signal and a transcript of the speech signal, the method comprising:

obtaining the speech signal and the transcript of the speech signal;

segmenting the speech signal to obtain multiple sets of utterance candidates for the speech signal, wherein respective ones of the multiple sets of utterance candidates have different utterance candidates;

segmenting the transcript of the speech signal to obtain one set of utterance-like units for the transcript;

performing automatic speech recognition of the multiple sets of the utterance candidates to obtain multiple sets of recognized texts for the speech signal;

converting the multiple sets of the recognized texts into multiple sets of estimated phone sequences;

converting the one set of utterance-like units into one set of reference phone sequences;

calculating costs of correspondences between respective ones of the multiple sets of the estimated phone sequences and the one set of the reference phone sequences;

determining a smallest cost set of the estimated phone sequences from the multiple sets of estimated phone sequences;

selecting a partial series of the estimated phone sequences, from the smallest cost set of the estimated phone sequences, by excluding one or more estimated phone sequences with high local mapping costs from the smallest cost set of the estimated phone sequences; and generating mapping data which includes the partial series of the estimated phone sequences and a corresponding series in the one set of the reference phone sequences, wherein the corresponding series corresponds to the partial series of the estimated phone sequences.

2. The computer-implemented method of claim 1, further comprising:
training an acoustic model, using the mapping data.

3. The computer-implemented method of claim 1, wherein the segmenting the speech signal includes using voice activity detection (VAD).

4. The computer-implemented method of claim 3, wherein the segmenting the speech signal to obtain one or more segmented speech signals includes using the VAD with different parameter values.

5. The computer-implemented method of claim 1, wherein the segmenting the transcript of the speech signal includes segmenting the transcript by referring to punctuations.

6. The computer-implemented method of claim 1, wherein the costs are distances between the respective ones of the multiple sets of the estimated phone sequences and the one set of the reference phone sequences.

7. A computer program product for mapping between a speech signal and a transcript of the speech signal, the computer program product comprising a non-transitory computer readable storage medium having program code embodied therewith, the program code executable to:
obtain the speech signal and the transcript of the speech signal;
segment the speech signal to obtain multiple sets of utterance candidates for the speech signal, wherein respective ones of the multiple sets of utterance candidates have different utterance candidates;
segment the transcript of the speech signal to one set of utterance-like units for the transcript;
perform automatic speech recognition of the multiple sets of the utterance candidates to obtain multiple sets of recognized texts for the speech signal;
convert the multiple sets of the recognized texts into multiple sets of estimated phone sequences;
convert the one set of utterance-like units into one set of reference phone sequences;
calculate costs of correspondences between respective ones of the multiple sets of the estimated phone sequences and the one set of the reference phone sequences;
determine a smallest cost set of the estimated phone sequences from the multiple sets of estimated phone sequences;
select a partial series of the estimated phone sequences, from the smallest cost set of the estimated phone sequences, by excluding one or more estimated phone sequences with high local mapping costs from the smallest cost set of the estimated phone sequences; and
mapping data which includes the partial series of the estimated phone sequences and a corresponding series in the one set of the reference phone sequences, wherein the corresponding series corresponds to the partial series of the estimated phone sequences.

8. The computer program product of claim 7, further comprising the program code executable to:
train an acoustic model, using the mapping data.

9. The computer program product of claim 7, wherein to segment the speech signal includes using voice activity detection (VAD).

10. The computer program product of claim 9, wherein to segment the speech signal to obtain one or more segmented speech signals includes using the VAD with different parameter values.

11. The computer program product of claim 7, wherein to segment the transcript of the speech signal includes segmenting the transcript by referring to punctuations.

12. The computer program product of claim 7, wherein the costs are distances between the respective ones of the multiple sets of the estimated phone sequences and the one set of the reference phone sequences.

13. A computer system for mapping between a speech signal and a transcript of the speech signal, the computer system comprising:
one or more processors, one or more computer readable tangible storage devices, and program instructions stored on at least one of the one or more computer readable tangible storage devices for execution by at least one of the one or more processors, the program instructions executable to:
obtain the speech signal and the transcript of the speech signal;
segment the speech signal to obtain multiple sets of utterance candidates for the speech signal, wherein respective ones of the multiple sets of utterance candidates have different utterance candidates;
segment the transcript of the speech signal to one set of utterance-like units for the transcript;
perform automatic speech recognition of the multiple sets of the utterance candidates one or more segmented speech signals to obtain multiple sets of recognized texts for the speech signal;
convert the multiple sets of the recognized texts into multiple sets of estimated phone sequences;
convert the one set of utterance-like units into one set of reference phone sequences;
calculate costs of correspondences between respective ones of the multiple sets of the estimated phone sequences and the one set of the reference phone sequences;
determine a smallest cost set of the estimated phone sequences from the multiple sets of estimated phone sequences;
select a partial series of the estimated phone sequences, from the smallest cost set of the estimated phone sequences, by excluding one or more estimated phone sequences with high local mapping costs from the smallest cost set of the estimated phone sequences; and
mapping data which includes the partial series of the estimated phone sequences and a corresponding series in the one set of the reference phone sequences, wherein the corresponding series corresponds to the partial series of the estimated phone sequences.

14. The computer system of claim 13, further comprising the program instructions executable to:
train an acoustic model, using the mapping data.

15. The computer system of claim 13, wherein to segment the speech signal includes using voice activity detection (VAD).

16. The computer system of claim 15, wherein to segment the speech signal to obtain one or more segmented speech signals includes using the VAD with different parameter values.

17. The computer system of claim 13, wherein to segment the transcript of the speech signal includes segmenting the transcript by referring to punctuations.

18. The computer system of claim 13, wherein the costs are distances between the respective ones of the multiple sets of the estimated phone sequences and the one set of the reference phone sequences.

* * * * *